June 25, 1940.  J. V. CAPUTO  2,205,681
WELDING APPARATUS
Filed Dec. 24, 1937   3 Sheets-Sheet 1

INVENTOR
James V. Caputo
by his attorneys
Stebbins, Blenko & Parmelee

June 25, 1940. J. V. CAPUTO 2,205,681
WELDING APPARATUS
Filed Dec. 24, 1937 3 Sheets-Sheet 2
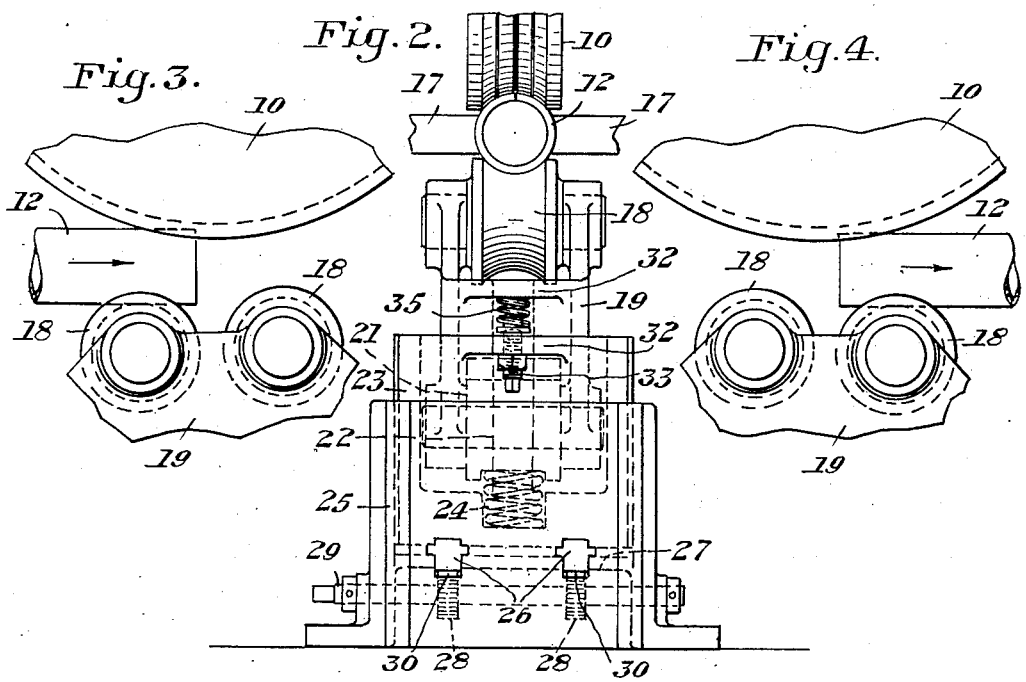

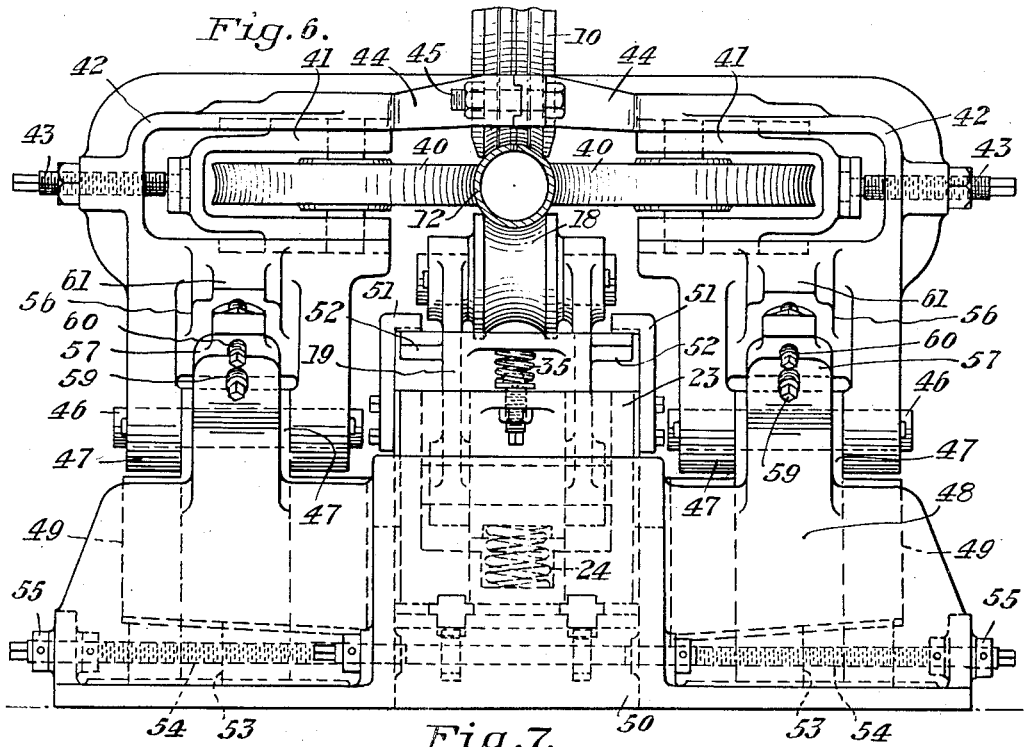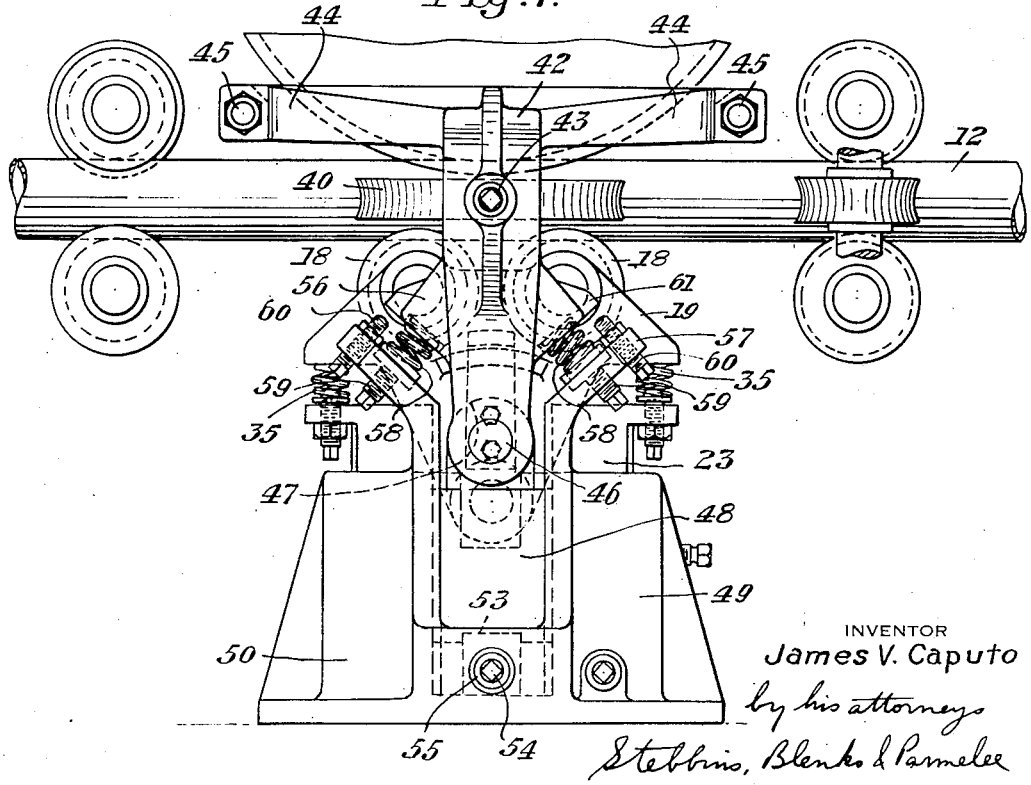

Patented June 25, 1940

2,205,681

UNITED STATES PATENT OFFICE 2,205,681

WELDING APPARATUS

James V. Caputo, Crafton, Pa.

Application December 24, 1937, Serial No. 181,579

7 Claims. (Cl. 219—6)

This invention relates to the art of welding, and in particular to progressive electric resistance welding. Progressive resistance welding is usually carrried out by passing the material to be welded, such as a formed pipe blank, through a welding throat including a disc electrode adapted to have rolling contact with the edges to be joined and cause the flow of welding current therebetween. Numerous objectionable results have been encountered in the actual practice of progressive resistance welding, among them, injury to the electrode, which is usually composed of copper which is relatively soft, by the relatively sharp end of the blank. It sometimes happens, furthermore, that a continuous weld is not produced. This renders the finished pipe liable to failure under hydrostatic test. It has also been observed that burning and pitting of the electrode itself has resulted from the high current density which has been employed in an effort to obtain a continuous weld.

I have invented an apparatus for welding which overcomes the aforementioned objections to previous methods and apparatus. In accordance with my invention, I provide a plurality of bottom support rolls spaced along the direction of travel of the blank being welded and disposed on opposite sides of the plane containing the electrode axis and normal to said direction of travel. I provide means for tiltably mounting the support rolls so that the one on the entering side of the electrode will be depressed by the blanks to permit the latter to pass beyond the zone of contact with the electrode before making firm conducting engagement with the latter. Similarly, as the trailing end of the blank leaves the electrode, it is displaced laterally from the latter before it actually leaves the contact zone.

A further feature of my invention is that it provides means for causing a slight bending of the blank at the point of contact with the electrode, whereby the area of the contact zone is increased, especially in the longitudinal direction. This means that a greater number of current alternations will traverse each point along the welded seam, providing greater assurance of a fluid-tight weld. I also relieve the edges of the cleft in the blank adjacent the ends thereof to facilitate upsetting the edges.

A complete understanding of the invention may be gained from the following detailed description, which is to be read in connection with the accompanying drawings illustrating a present preferred embodiment and practice. In the drawings:

Figure 2 is an end view with parts omitted;

Figure 3 is a partial diagrammatic view illustrating the operation of the apparatus.

Figure 4 is a view similar to Figure 3 showing a different stage of the operation;

Figure 5 is a view similar to Figure 1 showing a modification;

Figure 6 is a view similar to Figure 2 showing a modified form of the invention;

Figure 7 is a side elevation thereof; and

Figure 1:
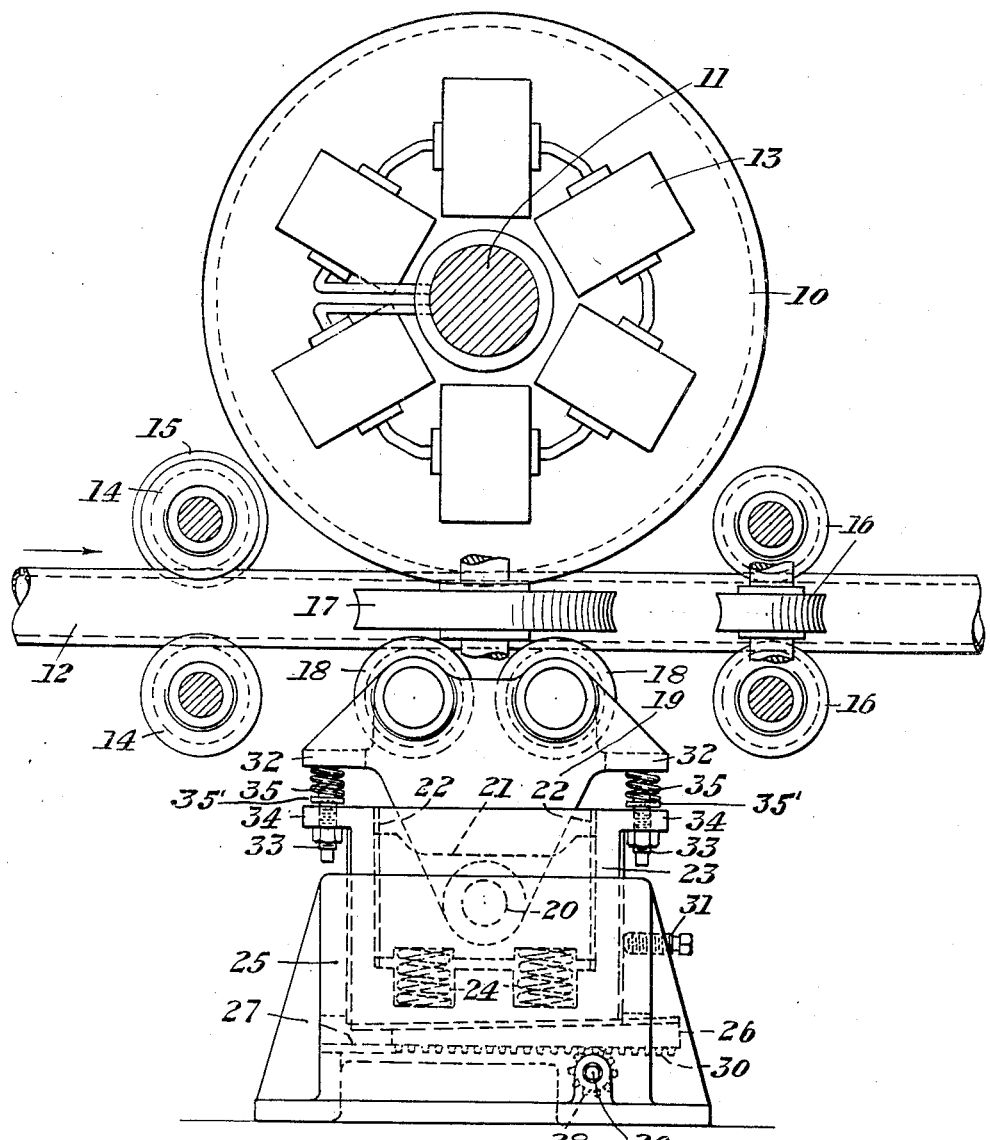
Figure 1 is a view, largely diagrammatic, partly in section and partly in side elevation, of a welding apparatus embodying the invention.

Referring now in detail to the drawings, a welding apparatus according to my invention includes an electrode 10 mounted on a shaft 11 for rotation therewith and for rolling tangential engagement with a moving work-piece such as a pipe blank 12. Transformers 13 mounted on the shaft 11 are adapted to supply welding current to the electrode 10, which is of the twin disk type, each of the two disks engaging one of the edges of the formed blank. The structure of the electrode and rotating transformers associated therewith is clearly described and claimed in my prior Patent No. 2,052,963, dated September 1, 1936. The invention may also be used for direct-current welding in which case any suitable source of such current may be connected to the electrode 10.

Feed rolls 14 serve to enter the blank accurately into the welding throat provided by the electrode and other rolls cooperating therewith to be described shortly. The upper roll 14 has a fin 15 adapted to enter the seam cleft extending longitudinally of the blank. Planishing rolls 16, similar to the feed rolls 14, except for the fin 15, serve to move the finished pipe away from the welding apparatus after passage therethrough. The welding throat before mentioned is composed of side pressure rolls 17 and bottom support rolls 18. The side pressure rolls, as well as the feed and exit rolls and the electrode shaft itself, are journaled in suitable bearings (not shown), preferably designed for vertical or lateral adjustment. The function of the side pressure roll 17 is to force the edges of the blank into firm engagement to complete a weld therebetween when the edges have been heated to incandescence by the passage of welding current therebetween. The bottom support rolls 18 which complete the welding throat withstand the downward pressure of the electrode 10 on the blank, which is necessary to insure the desired electrical contact therebetween. As shown, the side pressure rolls have their axes in the plane containing the axis of the electrode 10 and normal to the direction of travel of the blank 12, but these rolls will preferably be mounted for adjustment along the line of travel of the blank.

The bottom support rolls 18 are journaled on roller bearings in a single housing 19, so positioned that one of the rolls is on the entering side of the plane containing the axis of the electrode 10 and normal to the direction of blank travel, while the other roll is on the opposite side of this plane. The housing 19 is mounted in roller bearings for turning movement on a shaft 20, journaled in a slide block 21. The block 21 is slidable on ways 22 in a bearing box 23, being supported above the bottom of the latter by springs 24. The box 23 is similarly slidable in a base casting 25, being supported therein by wedges 26, adjustable along a transverse wall 27 of the base. For adjusting the wedges 26, pinions 28, fixed to an adjusting shaft 29, mesh with rack teeth 30, formed on the wedges. The box 23 may be secured in adjusting position by a set screw 31.

Shoulders 32 are formed on opposite sides of the housing 19 for engagement with the upper ends of studs 33, threaded through ears 34, extending outwardly from the bearing box 23. Springs 35 normally maintain the housing 19 in approximately the position in which it is shown in Figure 1. These springs are seated on cups 35', carried on the studs 33. It will be understood, however, that the housing 19 may be tilted in either direction from its central position if sufficient pressure is exerted, for example, on one of the rolls 18 to compress the adjacent spring 35. The springs 35 are normally under only light compression, whereby the tilting movement of the housing may be readily effected.

The operation of the invention will be explained with special reference to Figures 3 and 4. As shown in Figure 3, the leading end of a blank advancing toward the welding throat, after leaving the feed rolls 14, first engages the left-hand support roll 18. This forces the latter downward, tilting the housing 19 about the shaft 20 and raising the right-hand roll 18 correspondingly. With the parts in such positions, the blank advances beyond the plane containing the electrode axis and normal to the path of the blank without having more than superficial engagement, if any, with the periphery of the electrode. As the blank advances into engagement with the right-hand roll 18, however, the housing 19 is restored substantially to the position illustrated in Figure 1, and the blank is forced upwardly into firm electric conducting engagement with the electrode. This prevents injury to the electrode periphery which might result from the impact of the relatively sharp leading end of the blank on the soft metal of which the electrode is composed. It also prevents the commencement of current across the seam cleft until the end of the blank has passed beyond the normal contact zone. The reverse takes place when the trailing end of the blank passes beyond the electrode. As shown in Figure 4, the housing 19 tilts to the right as soon as the trailing end of the blank passes beyond the left-hand roll 18. The resulting lowering of the right-hand roll 18 permits the trailing end of the blank to move downwardly away from the electrode, thus preventing injury which might be caused by engagement of the relatively sharp trailing end of the blank with the electrode under the normal welding pressure exerted by the latter on the former. As soon as the blank has passed entirely beyond the right-hand roll 18, the springs 35 are effective to center the housing 19 to the position shown in Figure 1.

A further advantage of the construction shown, in addition to preventing injury to the electrode periphery, is that it provides a larger zone of contact between the electrode and blank, particularly in a direction along the length of the latter. Because of the location of the rolls 18 relative to the central plane of the electrode, the pressure exerted by the latter tends to cause a slight curvature of the blank edges. This causes the blank edges to engage the periphery of the electrode over a somewhat greater arc than would otherwise be the case and for a given speed and frequency causes each point along the welded seam to be traversed by a larger number of current alternations, insuring a more perfect weld. At the same time, the density of the welding current is decreased, lessening the chance of pitting or burning of the electrode.

A modification of the construction above described is shown in Figure 5. In this modification, the rolls 18 are journaled on roller bearings in separate housings 19', pivoted on the single shaft 20, which is also mounted on roller bearings. The housings 19' are yieldably connected by tie bolts 36, provided with compression springs 37. Otherwise the structure of Figure 5 is similar to that of Figure 1. The operation of the apparatus shown in Figure 5, furthermore, is substantially the same as that of Figure 1, the principal difference being the increased resilience introduced by the construction which permits either roll 18 to move independently of the other although normally they move simultaneously. A further difference in the construction of Figure 5 over that shown in Figure 1 is that the shaft 20 is journaled in fixed bearings carried on the box 23 rather than in the slide block, as shown in Figure 1.

Referring to Figures 6 and 7, the modification there shown includes bottom support rolls 18, journaled in roller bearings in a tiltable housing 19, practically identical with the structure shown in Figures 1 and 2. Other portions of the modification of Figures 6 and 7 corresponding to those of the forms of invention already described are designated by the same reference numerals. The modification of Figures 6 and 7 includes, in addition to means for tiltably mounting the bottom support rolls 18, means for similarly mounting side pressure rolls indicated at 40. The side pressure rolls 40 are journaled on roller bearings in bearing yokes 41. The yokes 41 are slidable laterally in housings 42. Adjusting screws 43, threaded through the housings, permit adjustment of the yokes 41 to and from the blank 12. As shown in the drawings, clearance is provided between the pressure rolls 40 and the yokes 41, and the rolls are mounted for axial movement in the yokes to the extent permitted by this clearance. In other words, the side pressure rolls are mounted for floating movement in the vertical direction.

The yokes 42 have arms 44 projecting in opposite directions therefrom along the direction of travel of the blank 12 and then transversely thereof. The arms 44 are tied together by bolts 45. This construction prevents spreading of the side pressure rolls and also causes them to move together by virtue of special mounting means provided therefor which will now be described.

The yokes 42 are pivotally mounted on shafts 46. The shafts 46 are journaled in bearings 47 formed at the upper ends of slide blocks 48. The slide blocks 48 are adjustable vertically in lateral extensions 49 of a base casting 50. In the central portion of the latter, the bearing box 23 of the modification of Figures 1 and 2 is adjustably supported. Angle brackets 51, secured to the box 23, limit upward movement of the housing 19 under the influence of the cushion spring 24. The housing 19 has lateral projections 52 adapted to be engaged by the brackets 51, without affecting the tiltable mounting of the housing.

The slide blocks 48 are supported in the extensions 49 of the base casting 50 on wedges 53. These wedges are adjustable laterally in ways formed in the base casting. Adjusting screws 54 are threaded through the wedges and journaled in thrust bearings 55 mounted in the extensions 49 of the base 50. Rotation of the screws 54 is facilitated by the square ends thereof and is effective to cause lateral movement of the wedges and vertical adjustment of the slide blocks 48.

The housings 42 are provided with laterally extending shoulders 56. The slide blocks 48 have inclined ears 57. Compression springs 58 engage the shoulders 56 and are held thereagainst by adjusting screws 59, threaded through the ears 57. Adjustable stop screws 60 are also threaded through the ears 57 for cooperation with projections 61 on the shoulders 56 to limit tilting movement of the housings 42.

The operation of the modification just described is similar to that of the one shown in Figures 1 and 2. In addition to the tilting of the support rolls 18, as the blanks enter and leave the welding throat, the side pressure rolls 40 are also tilted to the extent permitted by the stop screws 60. This movement and the clearance provided between the side pressure rolls and their bearing yokes, which permits vertical movement, insures that the side pressure rolls are always disposed at the proper level to receive and engage the blanks at all times during the passage thereof through the throat. In other words, the side pressure rolls follow the vertical movement of the portion of the blank under the electrode effected by the tilting of the support rolls 18.

Figure 8:
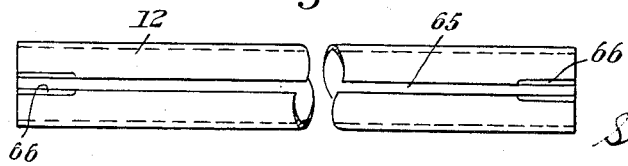
Figure 8 is a plan view of a blank adapted for welding in accordance with the method of my invention.

Figure 8 illustrates a form of blank which I prefer to employ. The blank, indicated generally at 12, is formed by bending flat plate into a cylinder, the abutting edges leaving a longitudinal seam cleft 65 therebetween. Adjacent the ends of the blank, I relieve the edges of the seam cleft as at 66. This result may be obtained by any convenient apparatus and the operation may be performed by shearing or otherwise machining off a portion of the edge of the seam cleft. The purpose in this is to permit the edges of the seam cleft to be forced together not only throughout the intermediate portion of the blank where the seam edges are heated to a temperature permitting such upsetting, but also adjacent the ends of the blank. It is well recognized that the edges of the seam cleft are not heated to welding temperature at the leading end of the blank in any resistance welder now known. By virtue of the described treatment of the ends of the blank, however, the seam cleft itself may be pressed together by the side pressure rolls at the ends of the blank, as well as at the intermediate portion thereof, even though the ends are not heated to full welding temperature.

When the tube is finally welded and completely upset, the inside edges abut with slight clearance at the outside, forming a recess such that this portion of the tube can be readily welded by either acetylene welding or arc welding, completing the welding of the entire length of the tube.

When resistance welding of the entire length of the tube is attempted, including the extreme forward and trailing ends, nicking of the electrode and blistering of the electrode and tube are almost unavoidable. When the welding of the seam edges is started or commenced only after the forward end of the tube has passed beyond the axial plane of the electrode, the amount of crop end loss will depend on the thickness of the wall of the tube, being greater as the tube wall is increased, depending on the resilience or hardness of the material being welded, unless the seam edges are relieved, as above explained. This also applies to the trailing end when welding ceases before the trailing end of the tube arrives at the axial plane of the electrode. By relieving the seam edges at both ends and in proper amount, welding commences or ends at the point where relieving of the seam edges begins. This insures uniform welding of the entire length of the tube, with equal upsetting at the point where the seam is relieved, and facilitating welding this portion by arc or acetylene welding, if so desired.

Although I have illustrated and described herein but a preferred embodiment and practice of the invention and a modification thereof, it will be understood that various changes in the construction and procedure described may be made without departing from the spirit of the invention or the scope of the appended claims.

I claim:

1. In an apparatus for progressively welding traveling abutting plate edges, a welding throat through which said edges are adapted to pass comprising rotary-disc current-supply means adapted to have electric-conducting contact with said edges, side-pressure rolls mounted for rotation on substantially parallel axes adapted to force said edges into firm abutment and upset them, the axis of said means lying substantially in the plane determined by the axes of said rolls, and a pair of bottom support rolls having their axes on opposite sides of said plane and spaced substantially equal distances therefrom.

2. In an apparatus for progressively welding traveling abutting plate edges, a welding throat through which said edges are adapted to pass comprising rotary-disc current-supply means adapted to have electric-conducting contact with said edges, side-pressure rolls mounted for rotation on substantially parallel axes adapted to force said edges into firm abutment and upset them, the axis of said means lying substantially in the plane determined by the axes of said rolls, a pair of bottom support rolls having their axes on opposite sides of said plane, a housing in which said support rolls are journaled, and means mounting said housing for limited tilting movement about an axis substantially parallel to the axes of the support rolls and lying substantially in said plane.

3. In an apparatus for progressively welding traveling abutting plate edges, a welding throat through which said edges are adapted to pass comprising rotary-disc current-supply means adapted to have electric-conducting contact with said edges, side-pressure rolls mounted for rotation on substantially parallel axes adapted to force said edges into firm abutment and upset them, the axis of said means lying substantially in the plane determined by the axes of said rolls, a pair of bottom support rolls having their axes on opposite sides of said plane, a housing in which said support rolls are journaled, means mounting said housing for limited tilting movement about an axis substantially parallel to the axes of the support rolls and lying substantially in said plane, and yieldable means normally effective to centralize said housing.

4. In an apparatus for welding abutting edges traveling in a longitudinal direction, the combination with a rotary-disc electrode, of a plurality of bottom support rolls cooperating therewith, a housing in which said rolls are journaled, means mounting said housing for tilting movement about an axis substantially parallel to, and lying substantially in a plane containing that of the electrode, which plane is normal to said direction, side-pressure rolls cooperating with said electrode and support rolls, housings in which said side-pressure rolls are journaled, and means mounting said last-mentioned housings for tilting movement about an axis parallel to that of the electrode.

5. In a welder, an electrode, side-pressure rolls and bottom support rolls cooperating therewith to define a welding pass or throat through which the material to be welded moves longitudinally in a predetermined direction, one of said support rolls being on the entry side of the throat and the other on the exit side, and means mounting said support rolls for tilting movement about an axis substantially parallel to the electrode axis and lying substantially in a plane normal to the travel of the blank including the electrode axis, whereby to force the edges of the material entering the pass against said electrode only while it engages the support roll on both sides of the pass.

6. In a welding apparatus, the combination with a disc electrode adapted to engage moving abutting edges to be welded, side pressure rolls and a bottom support roll cooperating therewith to define a welding throat, of a housing for each of said pressure rolls, said housings being tiltable in a plane substantially normal to the axis of said electrode, about an axis substantially perpendicular to the path of movement of said edges and spaced vertically from said path.

7. In a welding apparatus, the combination with a disc electrode adapted to engage moving abutting edges to be welded, side pressure rolls and a bottom support roll cooperating therewith to define a welding throat, of a housing for each of said pressure rolls, said housings being tiltable in a plane substantially normal to the axis of said electrode about an axis substantially perpendicular to the path of movement of said edges and spaced vertically from said path, and means tying said housings together for simultaneous tilting movement.

JAMES V. CAPUTO.